(12) United States Patent
van Leeuwen

(10) Patent No.: US 11,878,762 B2
(45) Date of Patent: Jan. 23, 2024

(54) UNIVERSAL BICYCLE RACK WITH SINGLE ATTACHMENT POINT

(71) Applicant: Matthijs van Leeuwen, Burien, WA (US)

(72) Inventor: Matthijs van Leeuwen, Burien, WA (US)

( * ) Notice: Subject to any disclaimer, the term of this patent is extended or adjusted under 35 U.S.C. 154(b) by 779 days.

(21) Appl. No.: 16/679,745

(22) Filed: Nov. 11, 2019

(65) Prior Publication Data

US 2021/0139097 A1    May 13, 2021

(51) Int. Cl.
 B62J 7/02    (2006.01)

(52) U.S. Cl.
 CPC ...................... B62J 7/02 (2013.01)

(58) Field of Classification Search
 CPC .................. B62J 7/02; B62J 7/04; B62J 7/06
 See application file for complete search history.

(56) References Cited

U.S. PATENT DOCUMENTS

| | | | | |
|---|---|---|---|---|
| 2,531,902 A * | 11/1950 | Baron | ........................ | B62J 7/00 224/431 |
| 2,537,441 A * | 1/1951 | Burri | .......................... | B62J 7/04 224/446 |
| 3,572,561 A * | 3/1971 | McCauley | ................. | B62J 7/04 224/427 |
| 3,873,127 A | 3/1975 | Griggs | | |
| 4,410,116 A * | 10/1983 | Mattei | ........................ | B62J 7/04 224/452 |
| 5,040,710 A | 8/1991 | Lee | | |
| 5,257,727 A | 11/1993 | Chen | | |
| 5,259,638 A * | 11/1993 | Krauss | ...................... | B62H 7/00 280/293 |
| 10,093,375 B1 * | 10/2018 | Cheng | ......................... | B62J 9/23 |
| 2002/0096858 A1 * | 7/2002 | Shaw | ....................... | B62H 7/00 280/288.4 |
| 2002/0121535 A1 | 9/2002 | Moore et al. | | |
| 2005/0258208 A1 * | 11/2005 | Pickett | ..................... | B62J 11/05 224/427 |
| 2006/0076380 A1 * | 4/2006 | Ockenden | .................. | B62J 7/02 224/419 |
| 2009/0289091 A1 | 11/2009 | Ulrich | | |
| 2018/0072361 A1 * | 3/2018 | McKenzie | ................. | B62J 9/26 |
| 2018/0370590 A1 * | 12/2018 | van Leeuwen | ........ | B62K 27/12 |
| 2019/0144063 A1 * | 5/2019 | van Leeuwen | ............ | B62J 9/22 224/419 |

FOREIGN PATENT DOCUMENTS

| | | | | |
|---|---|---|---|---|
| FR | 3117992 A1 * | 6/2022 | | |
| WO | WO-9411234 A1 * | 5/1994 | .............. | B62J 15/02 |

* cited by examiner

Primary Examiner — Joshua T Kennedy

(57) ABSTRACT

A universal bicycle rack with single attachment point is disclosed. The invention, referred to herein as an 'integrated rack connection assembly' (IRCA) is comprised of three main parts. A first part being a tubular, platform, section (PS) with crossbar members for holding user items (such as bags, cases, etc.); a second part being a Connection section (CS) for attaching the IRCA to a bicycle frame; and a third part being a tubular; platform assembly (PA) connecting the PS to the CS allowing a user to position the IRCA at various angles on a bike frame: The CS also having clamping plates allowing the apparatus to fit onto frames of different shapes and sizes. An object of the invention is to leverage the stability of a bike's central frame through a single attachment when storing items on a bicycle.

6 Claims, 6 Drawing Sheets

UNIVERSAL BICYCLE RACK WITH SINGLE ATTACHMENT POINT

FIELD OF THE INVENTION

The present invention generally relates to bicycle accessories. More specifically, it relates to a universal bicycle rack with single attachment point.

BACKGROUND

The earliest cargo carriers were called 'panniers' and consisted of bags and satchels attached to the sides of horses and donkeys. Traditional panniers for animal transport were typically made of canvas, leather, and wicker and were loaded in such a manner as to distribute weight evenly on each side of the animal. The first such carriers designed specifically for bicycles were mass-produced by John Wood in New Jersey in the mid-1800s. The first modern bicycle cargo and luggage carriers were developed by Hartley Alley of Boulder, Colo., in the early 1970s. Alley also designed a handlebar bag he manufactured and sold under the 'Touring Cyclist' brand in the 1970s until his retirement in 1984. As bicycles began to change and new streamlined, frame designs emerged, the cycling accessory industry began developing creative solutions to carry items on bicycles. U.S. Pat. Nos. 3,873,127A and 5,257,727A granted to Murray and Griggs and Chen respectively, teach of a conventional bicycle rack that is configured to be installed above the rear wheel of a bicycle. United States Patent No.s US20090289091A1 and US20020121535A1 granted to Ulrich and Moore & Moore respectively, disclosed cargo racks for cycles and scooters that have single attachment points; however, they can only be affixed to seat stems. U.S. Pat. No. 5,040,710A and US20050258208A1 granted to Lee and Pickett respectively disclosed universal utility racks with single attachment points that fit different frame sizes; however, they do not allow for pivoting angle options disposed between two racks.

SUMMARY OF THE INVENTION

The device herein disclosed and described provides a solution to the shortcomings in the prior art through the disclosure of an integrated rack connection assembly (IRCA). An object of the invention is to leverage the stability of the proximal portions of a bicycle frame—such as the top tube, the seat tube and the down tube. Conventional racks affixed to parts of bicycles distal to the rider (such as handle bars and fenders) are routinely subjected to constant vibrations and tipping which can impact storage and in extreme cases cause items to shift and even fall from the bike.

Another object of the invention is to provide a means to allow users to affix the IRCA at a single point along a bicycle frame. A single attachment point limits the amount of space required to support the rack and less interference with moving components of the bicycle and rider. The clamping system is easy to affix and can be slid along a tube for proper positioning.

Another object of this invention is to provide a means to adjust the angle of the platform section (PS) relative to the connection section (CS) by means of the platform assembly (PA). The PA has a pivoting member with a multitude of locking screws allowing the IRCA to adjust to several acute or obtuse angles depending on how the apparatus is flipped. This angle adjustment feature allows a user to install the IRCA in a plurality of positions along the frame of the bicycle according to their preference—such as positioning the PA at the front, center or rear of the bicycle frame.

Another object of the aforementioned invention is to allow a user to affix strapping systems to hold items (luggage, child seats etc.) onto the IRCA. The PA has cross bar members that provide anchor points for bungies, ropes, etc.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE FIGURES

The accompanying drawings, which are incorporated herein and form a part of the specification, illustrate some, but not the only or exclusive, examples of embodiments and/or features.

Figures 1, 1A:
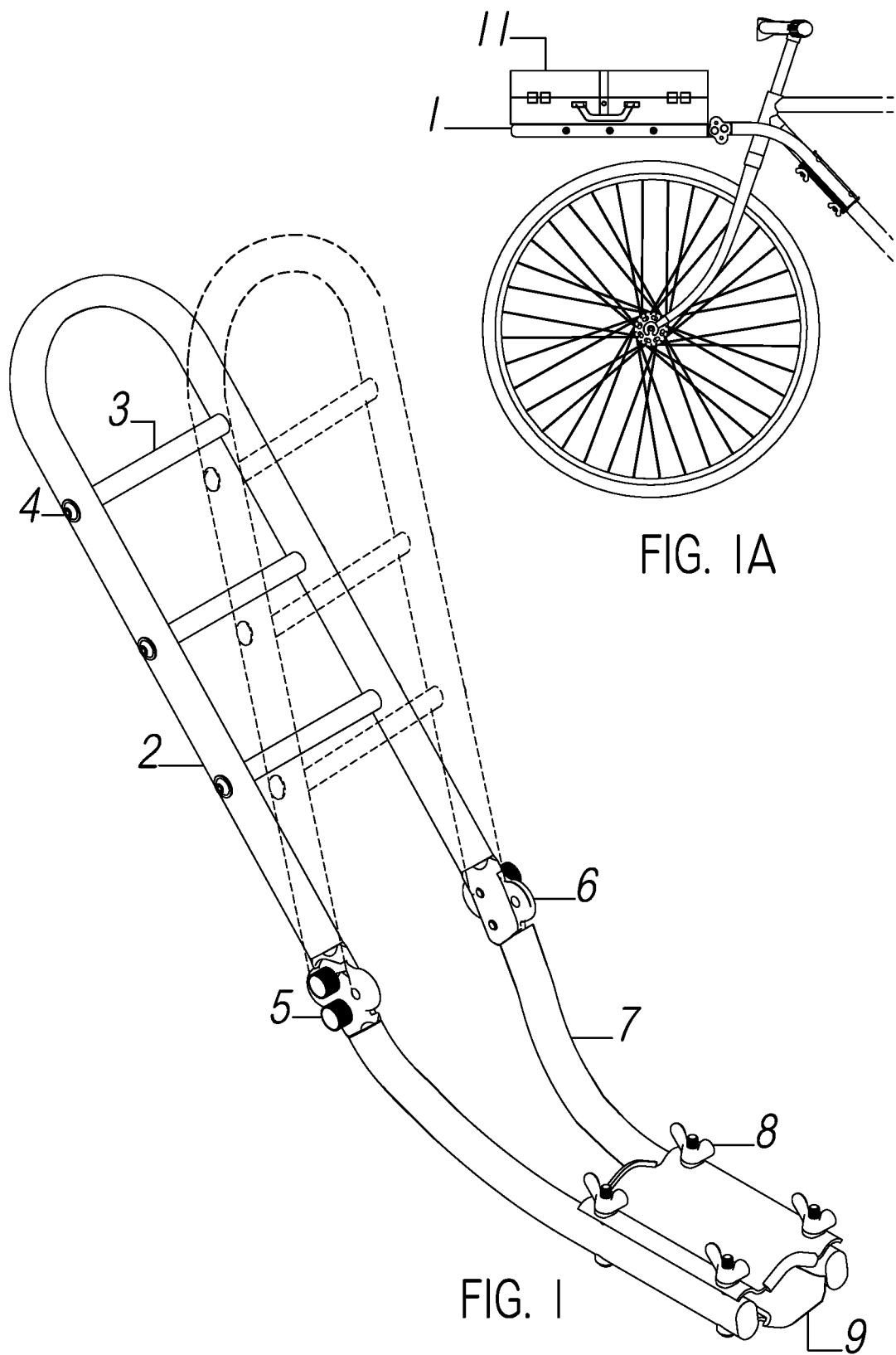
FIG. 1 shows a perspective view of the invention.
FIG. 1A shows a side view of the invention with luggage.

Other aspects of the present invention shall be more readily understood when considered in conjunction with the accompanying drawings, and the following detailed description, neither of which should be considered limiting.

DETAILED DESCRIPTION OF FIGURES

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation. Conventional components of the invention are elements that are well-known in the prior art and will not be discussed in detail for this disclosure.

FIG. 1 showing the preferred embodiment of the invention 1 comprised of parts PS 2, CS 7 and PA 6. Said PS 2 being U-shaped and made of tubular, rigid material such as but not limited to aluminum, carbon fiber, plastic and the like and having a plurality of apertures configured perpendicular to its longitudinal axis. Fasteners 4 connecting threaded apertures in a plurality of cross bar members 3 to the PS 2 which are also disposed perpendicular to PS 2's longitudinal axis—also being made of a tubular, rigid material such as but not limited to aluminum, carbon fiber, plastic etc. The figure also showing CS 7 at least but not limited to two, tubes comprised of a rigid material such as but not limited to aluminum, carbon fiber, plastic and the like and having a plurality of apertures configured perpendicular to its longitudinal axis. Fasteners 8 connecting at least two clamping plates 9 to the CS 7 which are disposed parallel to CS 7's longitudinal axis. Clamping plates 9 having fastener apertures and are made of a rigid material such as metal and the like. Said clamping plates 9 having a planar, rectangular shape with a proximal curvature along its longitudinal axis configured to receive cylindrical bicycle frame tubes there between when assembled and compressed by fasteners 8 to said CS 7. The aforementioned PS 2 and CS 7 being pivotably connected on distal ends by means of PA 6. PA 6 having two components (one for each of the two distal ends of the PS 2 and PA 6) being made of a rigid material such as but not limited to metal and the like. Said two PA 6 components having two parts: one part being a planar-shaped, slotted member configured to receive a second, planar-shaped, tine-shaped member part therein allowing the PS 2 to be pivotably rotated relative the CS 7. The aforementioned slotted and tine members having a multitude of matching, threaded apertures to receive anchor bolts 5 wherein a single anchor bolt 5 providing a pivot point and another bolt 5 releasably locking the PS 2 at a predetermined angle depending upon aperture alignments. FIG. 1A shows a side view of the IRCA 1 with luggage 11 stowed thereon.

Figure 2:
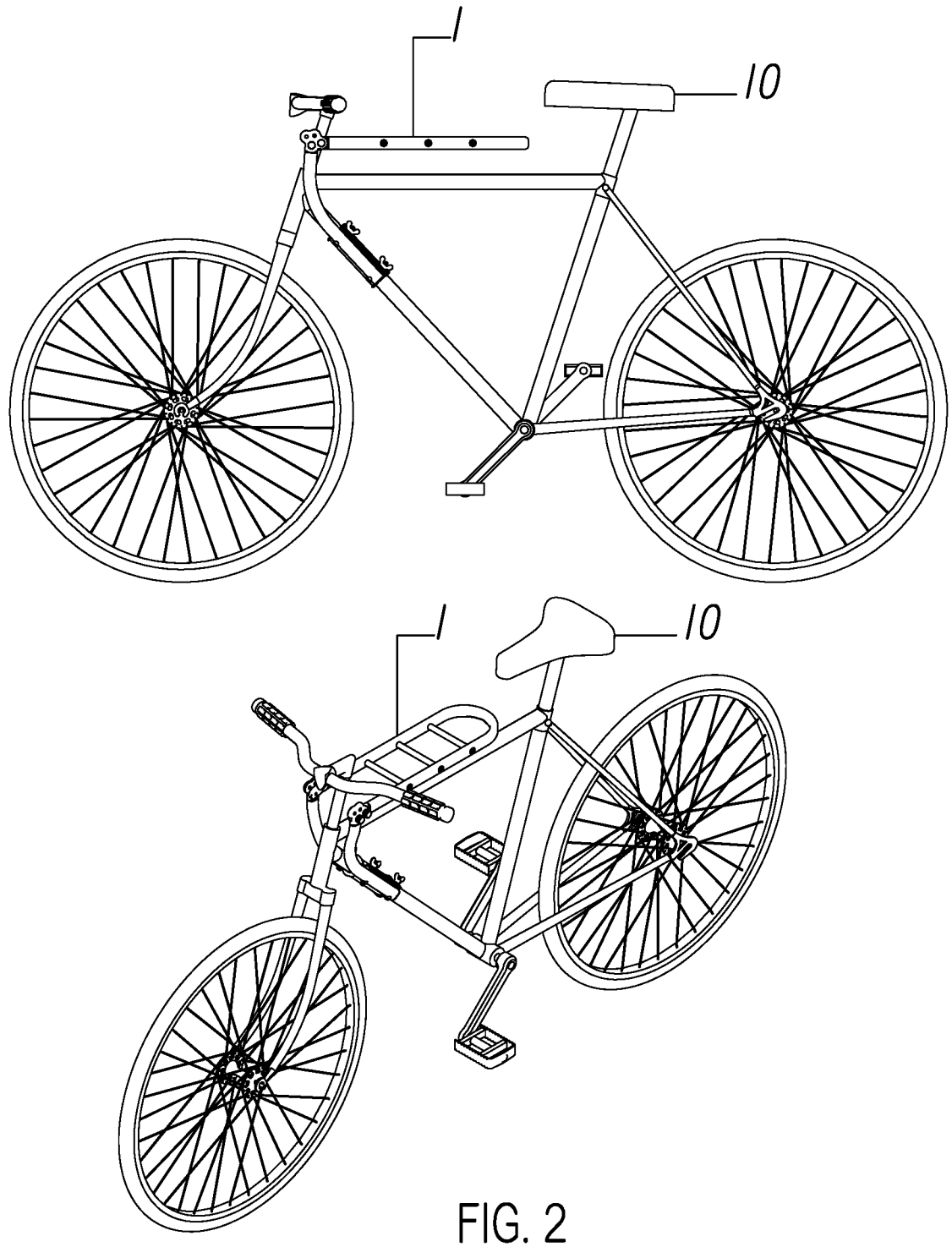
FIG. 2 shows a side and perspective view of the invention attached to a down tube.
Figure 3:
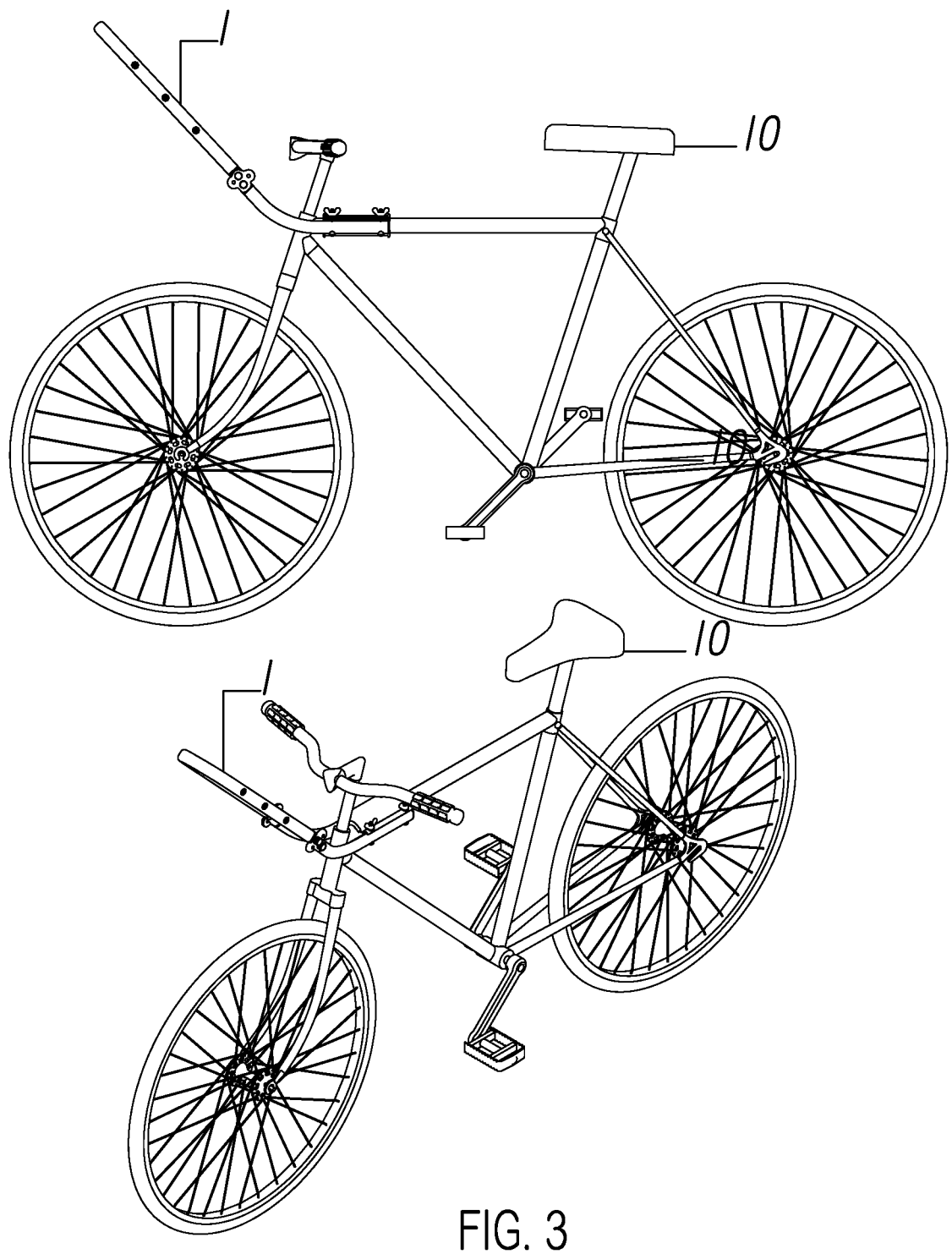
FIG. 3 shows a side and perspective view of the invention attached to a top tube.
Figure 4:
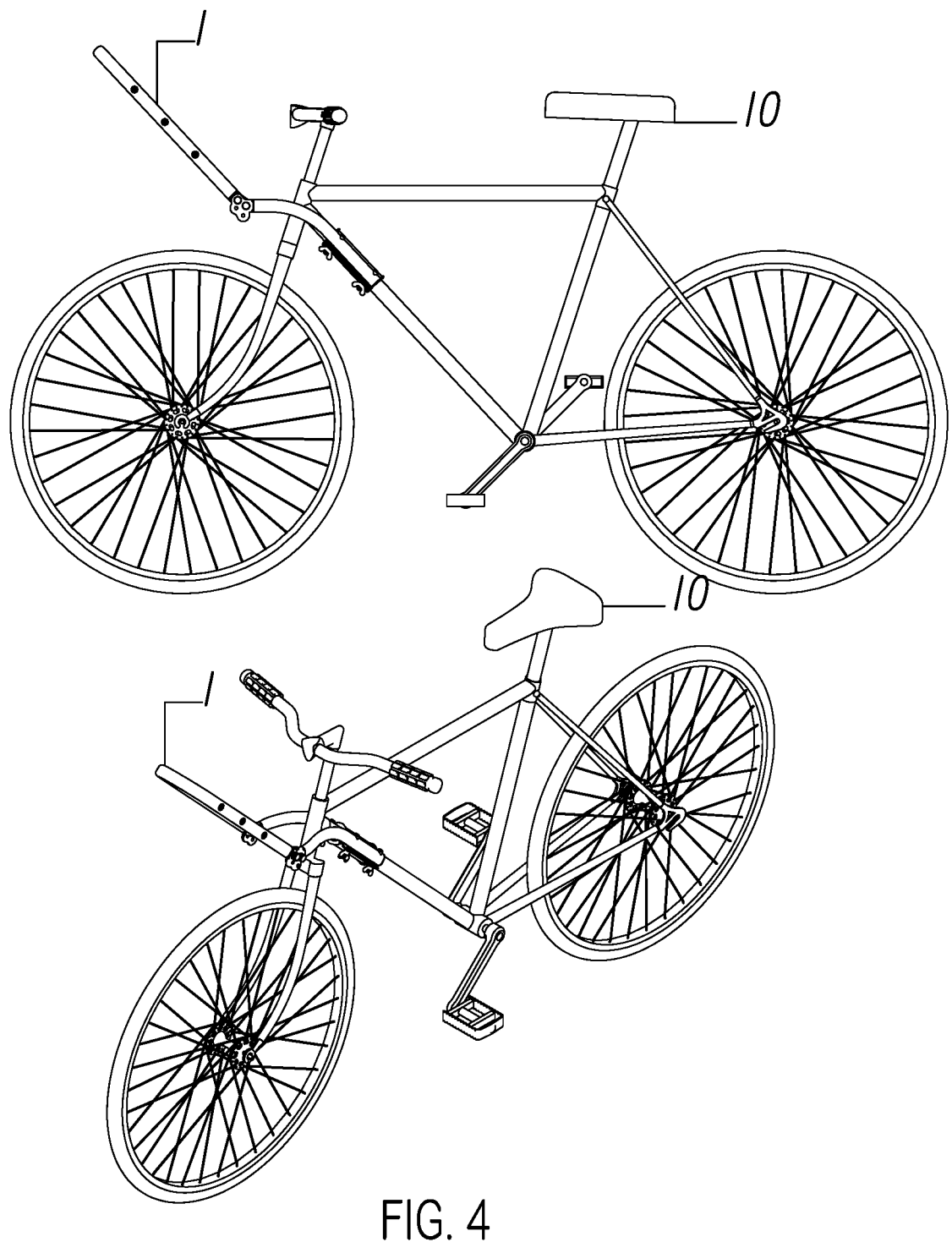
FIG. 4 shows a side and perspective view of the invention attached to a down tube.
Figure 5:
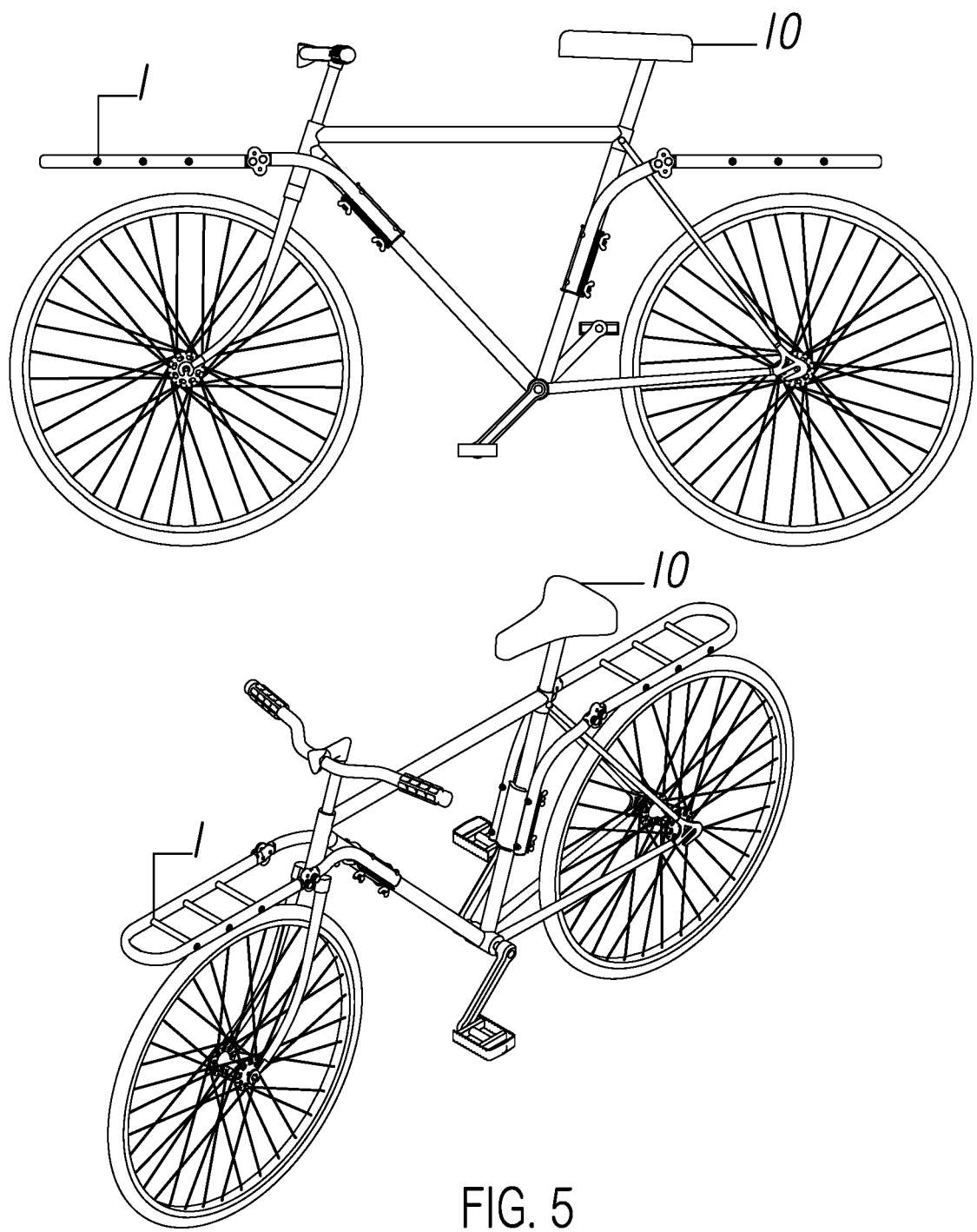
FIG. 5 shows a side and perspective view of the ICRAs attached to a down tube and step tube.
Figure 6:
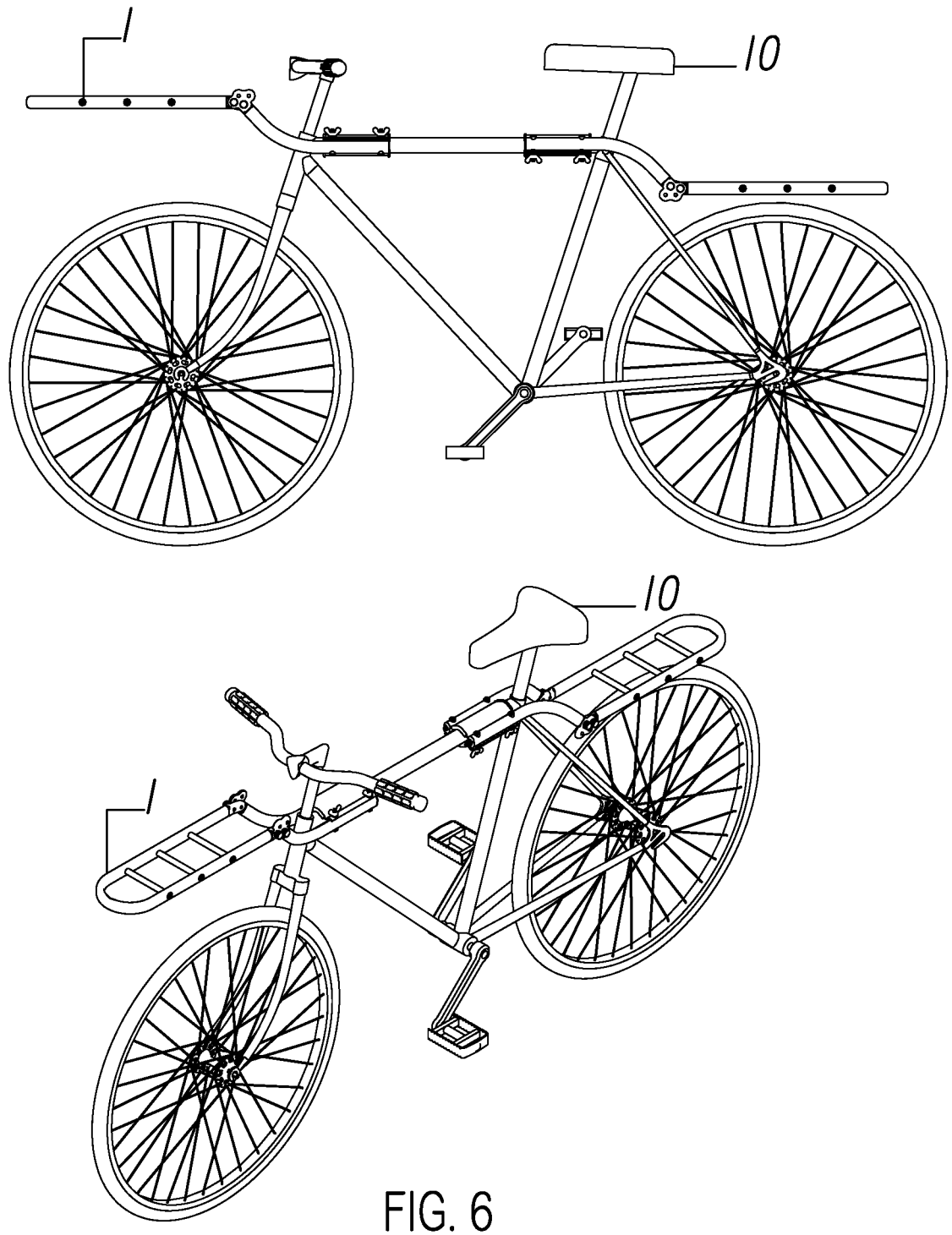
FIG. 6 shows a side and perspective view of two ICRAs attached to a down tube.

FIGS. 2-6 showing various methods of installing the IRCA 1 on a bicycle frame. FIG. 2 shows a side and perspective view of IRCA 1 attached to a down tube. FIG. 3 shows a side and perspective view of IRCA 1 attached to a top tube. FIG. 4 shows a side and perspective view of the IRCA 1 attached to a down tube. FIG. 5 shows a side and perspective view of the ICRA 1s attached to a down tube and step tube. FIG. 6 shows a side and perspective view of two ICRA 1s attached to a down tube.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the scope of the invention.

What is claimed is:

1. An integrated rack connection assembly for bicybles comprising:
    a) a platform section for holding items, said platform section having a frontal portion adapted to substantially extend across wheel or a frame of a bicycle;
    b) a connection section for removably connecting the integrated rack connection to a bicycle frame; the connection section comprising:
        two tubes, each tube having a plurality of apertures along its length and perpendicular to its longitudinal axis;
        the plurality of apertures being directed away from each other and not being on the same axis and;
    c) a pivot assembly for adjusting angles of the platform section relative to the connection section to fit bicycle frames;
    d) a pair of clamping plates, each having a rectangular shape with a length greater than a width and a concave central portion along the length; and
    e) a plurality of fasteners;
    wherein the plurality of fasteners extend through the clamping plates and the plurality of apertures of the connection section such that the length of each clamping plate is arranged parallel along the two tubes of the connection section and wherein the clamping plates and the two tubes are configured to receive a portion of a bicycle frame therebetween.

2. The integrated rack connection assembly for bicycles of claim 1 wherein the platform section being U-shaped and having cross bars configured there between adapted to secure items and enhance strength of the platform section.

3. The integrated rack connection assembly for bicycles of claim 1 wherein the platform assembly
    has a planar-shaped slotted member configured to receive a second planar-shaped tine-shaped member part therein allowing the platform section to be pivotably rotated relative to the connection section.

4. The integrated rack connection assembly for bicycles of claim 3 the slotted and tine members having a multitude apertures to receive bolts wherein a single anchor bolt providing a pivot point and another bolt releasably locking the platform section 2 at a predetermined angle.

5. The integrated rack connection assembly for bicycles of claim 1 wherein the connection section connects to any tube on the bicycle frame to create an extended loading platform either front, center or rear.

6. A method for carrying an item on a bicycle frame, the method comprised of the following steps:

provinding a platform section for holding items, said platform section having a frontal portion adapted to substantially extend across a wheel or a frame of a bicycle;

providing a connection section for removably connecting the integrated rack connection to a bicycle frame; the connection section comprising:

two tubes, each tube having a plurality of apertures along its length and perpendicular to its longitudinal axis;

the plurality of apertures being directed away from each other and not being on the same axis and;

connecting the platform and connection section with a pivot assembly for adjusting angles of the platform section relative to the connection section to fit bicycle frames;

setting an angle between the platform section and connection section to a desired angle;

selecting a bicycle frame;

providing a pair of clamping plates having apertures, each having a rectangular shape with a length greater than a width and a concave central portion along the length; and providing a plurality of fasteners;

placing the pair of clamping plates facing each other on opposite sides of the bicycle frame;

lining up the apertures in the clamping plates and two tubes;

placing fasteners in the lined up apertures and two tubes and the fasteners through the clamping plates and the plurality of apertures of the connection section such that the length of each clamping plate is arranged parallel along the two tubes of the connection section and wherein the clamping plates and the two tubes are configured to receive a portion of a bicycle frame therebetween; and placing the item on the platform section.

\* \* \* \* \*